(12) United States Patent
Murata et al.

(10) Patent No.: US 12,292,072 B2
(45) Date of Patent: May 6, 2025

(54) MANAGEMENT SYSTEM USING A SENSING WASHER FOR DETECTING ATTACHMENT STATE OF ATTACHMENT OBJECT

(71) Applicant: Alps Alpine Co., Ltd., Tokyo (JP)

(72) Inventors: Shinji Murata, Miyagi (JP); Ryu Arasawa, Tokyo (JP); Jun Asami, Tokyo (JP)

(73) Assignee: Alps Alpine Co., Ltd. (JP)

( * ) Notice: Subject to any disclaimer, the term of this patent is extended or adjusted under 35 U.S.C. 154(b) by 249 days.

(21) Appl. No.: 17/942,523

(22) Filed: Sep. 12, 2022

(65) Prior Publication Data

US 2023/0003247 A1 Jan. 5, 2023

Related U.S. Application Data

(63) Continuation of application No. PCT/JP2021/014740, filed on Apr. 7, 2021.

(30) Foreign Application Priority Data

Apr. 13, 2020 (JP) .................................. 2020-071697

(51) Int. Cl.
*F16B 31/02* (2006.01)
*G01B 7/16* (2006.01)
*G01L 5/24* (2006.01)

(52) U.S. Cl.
CPC .............. *F16B 31/028* (2013.01); *G01B 7/16* (2013.01); *G01L 5/243* (2013.01)

(58) Field of Classification Search
CPC ......... F16B 31/02; F16B 31/028; G01L 5/243
See application file for complete search history.

(56) References Cited

U.S. PATENT DOCUMENTS

| | | | |
|---|---|---|---|
| 9,483,674 | B1 | 11/2016 | Fink et al. |
| 2017/0016469 | A1 | 1/2017 | Zhu et al. |
| 2019/0226886 | A1 | 7/2019 | Bromley |

FOREIGN PATENT DOCUMENTS

| | | |
|---|---|---|
| DE | 102011005371 A1 | 9/2012 |
| DE | 102012020932 A1 | 4/2014 |

(Continued)

OTHER PUBLICATIONS

International Search Report for corresponding International Application No. PCT/JP2021/014740 dated May 11, 2021 (2 Pages).

*Primary Examiner* — Eric S. McCall
(74) *Attorney, Agent, or Firm* — Harness, Dickey & Pierce, P.L.C.

(57) ABSTRACT

In a management system for an attachment state of an attachment object, a sensor capable of detecting a value equivalent to stress of stress loaded, or a predetermined value from which the value equivalent to stress can be calculated, a washer storage unit storing identification information of a sensing washer, and a washer control unit transmitting the value equivalent to stress and the identification information of the sensing washer via a communication unit, are provided in the sensing washer between a bolt and a nut that attach an attachment object to a structural object. A management processing device acquires the value equivalent to stress and identification information of the sensing washer transmitted from the sensing washer, and presents the value equivalent to stress of the sensing washer of the identification information, or a corresponding stress value, as relational information with respect to a reference value stored in a storage unit.

4 Claims, 9 Drawing Sheets

(56) References Cited

FOREIGN PATENT DOCUMENTS

| | | |
|---|---|---|
| JP | 2009-066667 A | 4/2009 |
| JP | 2017-181785 A | 10/2017 |
| JP | 6619863 B1 | 12/2019 |

MANAGEMENT SYSTEM USING A SENSING WASHER FOR DETECTING ATTACHMENT STATE OF ATTACHMENT OBJECT

CLAIM OF PRIORITY

This application is a Continuation of International Application No. PCT/JP2021/014740 filed on Apr. 7, 2021, which claims benefit of Japanese Patent Application No. 2020-071697 filed on Apr. 13, 2020. The entire contents of each application noted above are hereby incorporated by reference.

BACKGROUND OF THE INVENTION

1. Field of the Invention

The present invention relates to a management system for managing an attachment state of an attachment object attached to a structural object by a bolt and a nut.

2. Description of the Related Art

Conventionally, management of a suitable state of attachment regarding attachment objects that are attached to structural objects by bolts and nuts is primarily performed by visual inspection, and loosening of fastened bolts and nuts is visually confirmed. Inspection using match marks is performed, in order to perform this visual inspection easily and reliably. For example, as illustrated in FIGS. 9A and 9B, in a structure in which an attachment object 200 is fit over a bolt 201 passed through a structural object, nuts 203 and 204 of a locking double-nut arrangement are screwed onto the bolt 201 over a washer 202, thereby attaching the attachment object 200, and after confirmation of a suitable fastening state, match marks 200m, 202m, 203m, and 204m are applied to corresponding positions on the attachment object 200, the washer 202, and the nuts 203 and 204. Thereafter, at when performing inspection, whether the positions of the match mark 200m of the attachment object 200, the match mark 202m of the washer 202, and the match marks 203m and 204m of the nuts 203 and 204 are matching at corresponding positions by up-close visual inspection, thus confirming whether or not there is any loosening of the nut fastening. FIG. 9A illustrates a case of a suitable state in which there is no loosening of the nut fastening, and FIG. 9B illustrates a case of an unsuitable state in which a nut is loose.

Also, there are methods for inspection at high places where close-up visual observation cannot be performed, such as attaching a camera to an extensible pole member and taking images to perform inspection, such as in Japanese Unexamined Patent Application Publication No. 2017-181785, or attaching a camera to a flying object such as a drone and taking images, and receiving and confirming the taken images, such as in Japanese Patent No. 6619863.

However, up-close visual inspection of the state of nut fastenings, inspection by taking images using a pole or flying object, or the like, requires a great amount of manpower and long inspection time, which is problematic in that inspection costs are high. Further, inspection methods such as close-up visual confirmation and confirmation of taken image by human eye incur risks of overlooking unsuitable states. Also, analyzing taken images using image analysis software to inspect suitable and unsuitable states necessitates using extremely expensive image analysis software, which is problematic in that inspection costs markedly rise.

Accordingly, there is demand for a system by which suitable states and unsuitable states of attachment of attachment objects can be accurately comprehended, and inspection work can be performed in a short time at low costs.

SUMMARY OF THE INVENTION

The present invention provides a management system for an attachment state of an attachment object, in which suitable states and unsuitable states of attachment of attachment objects can be accurately comprehended, and inspection work can be performed in a short time at low costs.

In a management system for an attachment state of an attachment object according to the present invention, a sensor that is capable of detecting a value equivalent to stress of stress that is being loaded, or a predetermined value from which the value equivalent to stress can be calculated, a washer storage unit that stores identification information of a sensing washer, and a washer control unit that transmits the value equivalent to stress and the identification information of the sensing washer via a communication unit, are provided in the sensing washer that is interposed between a bolt and a nut that attach an attachment object to a structural object. A management processing device acquires the value equivalent to stress and the identification information of the sensing washer that are transmitted from the sensing washer, and presents the value equivalent to stress of the sensing washer having the identification information, or a stress value corresponding thereto, as relational information with respect to a reference value stored in a storage unit.

Accordingly, presenting relational information of the value equivalent to stress of the stress by which the sensing washer is loaded and the reference value for the stress value enables suitable states and unsuitable states of nut fastening corresponding to the sensing washer to be accurately comprehended. Thus, suitable states and unsuitable states of attachment of the attachment object that is attached by the bolt and the nut can be accurately comprehended. Also, the management processing device acquires the value equivalent to stress and the identification information of the sensing washer that are transmitted from the sensing washer, and presents relational information, which enables the value equivalent to stress and the identification information of the sensing washer that are transmitted from the sensing washer to be received while traveling in an automobile in which the management processing device or the reader is loaded for example, and so forth, and inspection work can be performed in a short time at low costs. Also, transmitting the value equivalent to stress and the identification information of the sensing washer from the sensing washer via the communication unit enables application to high places and places in service for traffic, and accordingly the safety of inspection work of the attachment state of attachment objects can be improved. Also, the present management system can be used not only at the time of inspection work for the attachment state of attachment objects, but for installation completion testing immediately following attachment of the attachment object. Also, the work of applying conventional match marks can be done away with, and the amount of labor in the installation work to perform attachment of the attachment object suitably can be reduced. Also, the present management system can be applied to attachment objects already attached to structural objects by bolts and nuts via ordinary washers, by replacing the ordinary washers with the sensing washer. Also, in a case of the management processing device performing processing of acquiring the value equivalent to stress and the identification information of the sensing washer transmitted from the sensing washer, and storing the value equivalent to stress or a stress value corresponding thereto of the sensing washer having the identification information, in a storage unit periodically with predetermined intervals therebetween, quantitative values equivalent to stress or stress values corresponding to the sensing washer of this identification information can be automatically accumulated as a periodic inspection record, for example.

In the management system for an attachment state of an attachment object according to the present invention, the management processing device compares the value equivalent to stress or the stress value corresponding thereto with the reference value, presents suitability information of a nut fastening corresponding to the sensing washer having the identification information as the relational information in a case in which the reference value is exceeded, and presents unsuitability information of a nut fastening corresponding to the sensing washer having the identification information as the relational information in a case of being no greater than the reference value.

Accordingly, by presenting suitability information of nut fastening regarding a sensing washer having the identification information, suitability and unsuitability of the attachment state of the attachment object can be accurately and reliably comprehended, regardless of the level of skill of the manager.

In the management system for an attachment state of an attachment object according to the present invention, the management processing device presents the value equivalent to stress or the stress value corresponding thereto with the reference value at the same time, as the relational information.

Accordingly, by presenting the value equivalent to stress corresponding to the sensing washer having this identification information or the stress value corresponding thereto with the reference value at the same time, as the relational information, the manager can speedily and accurately recognize information relating to the attachment state of the attachment object, such as for example, the state of the nut fastening, whether maintenance of the attachment state of the attachment object is necessary or unnecessary at the current point in time, when the time at which maintenance of the attachment state of the attachment object is predicted to be necessary, and so forth.

In the management system for an attachment state of an attachment object according to the present invention, the sensing washer includes a strain element that is loaded with stress, and a strain sensor that is equivalent to the sensor and that is fixed to the strain element, and the washer control unit transmits a resistance value sensed by the strain sensor in accordance with deformation of the strain element, as the value equivalent to stress.

Accordingly, the resistance value can be easily acquired as the value equivalent to stress of the sensing washer interposed between the bolt and the nut, and transmitted from the sensing washer.

In the management system for an attachment state of an attachment object according to the present invention, the communication unit of the sensing washer is accommodated in a casing that is insulating, the sensing washer has a strain element that is made of metal and that is loaded with stress, and the communication unit is placed distanced from the strain element made of metal.

Accordingly, accommodating communication unit of the sensing washer in casing that is insulating can do away with attenuation of communication signals occurring in a case in which the casing is electroconductive, such as being made of metal or the like, and good communication performance can be secured. Also, placing the communication unit of the sensing washer so as to be distanced from the strain element that is made of metal can do away with attenuation of communication signals occurring in a case in which the strain element that is electroconductive and communication unit are in close proximity, and good communication performance can be secured.

In the management system for an attachment state of an attachment object according to the preset invention, the casing of the sensing washer accommodating the washer storage unit and the washer control unit is provided at a position that is laterally deviated and flaring from the nut.

Accordingly, by providing the casing of the sensing washer so as to be laterally deviated and flaring from the nut, interference between the sensing washer and a nut screwed to an adjacent bolt attaching the attachment object, for example, can be prevented while securing accommodation space for the washer storage unit and the washer control unit in the sensing washer. Also, forming the casing of the sensing washer so as to be laterally deviated and flaring from the strain element, rather than reducing the size, enables the sensing washer to be manufactured at lower costs, and also facilitates visual comprehension that the sensing washer and the sensor are disposed at the nut fastening site.

In the management system for an attachment state of an attachment object according to the present invention, electric power necessary for operations of the washer control unit of the sensing washer is supplied by wireless power transfer from a reader that transmits the value equivalent to stress and the identification information of the sensing washer that are transmitted from the sensing washer to the management processing device, or from the management processing device.

Accordingly, disposing a battery at the sensing washer side becomes unnecessary, and reduced size of the form of the sensing washer, reduced costs, and long life, can be realized.

DESCRIPTION OF THE PREFERRED EMBODIMENTS

Figure 1:
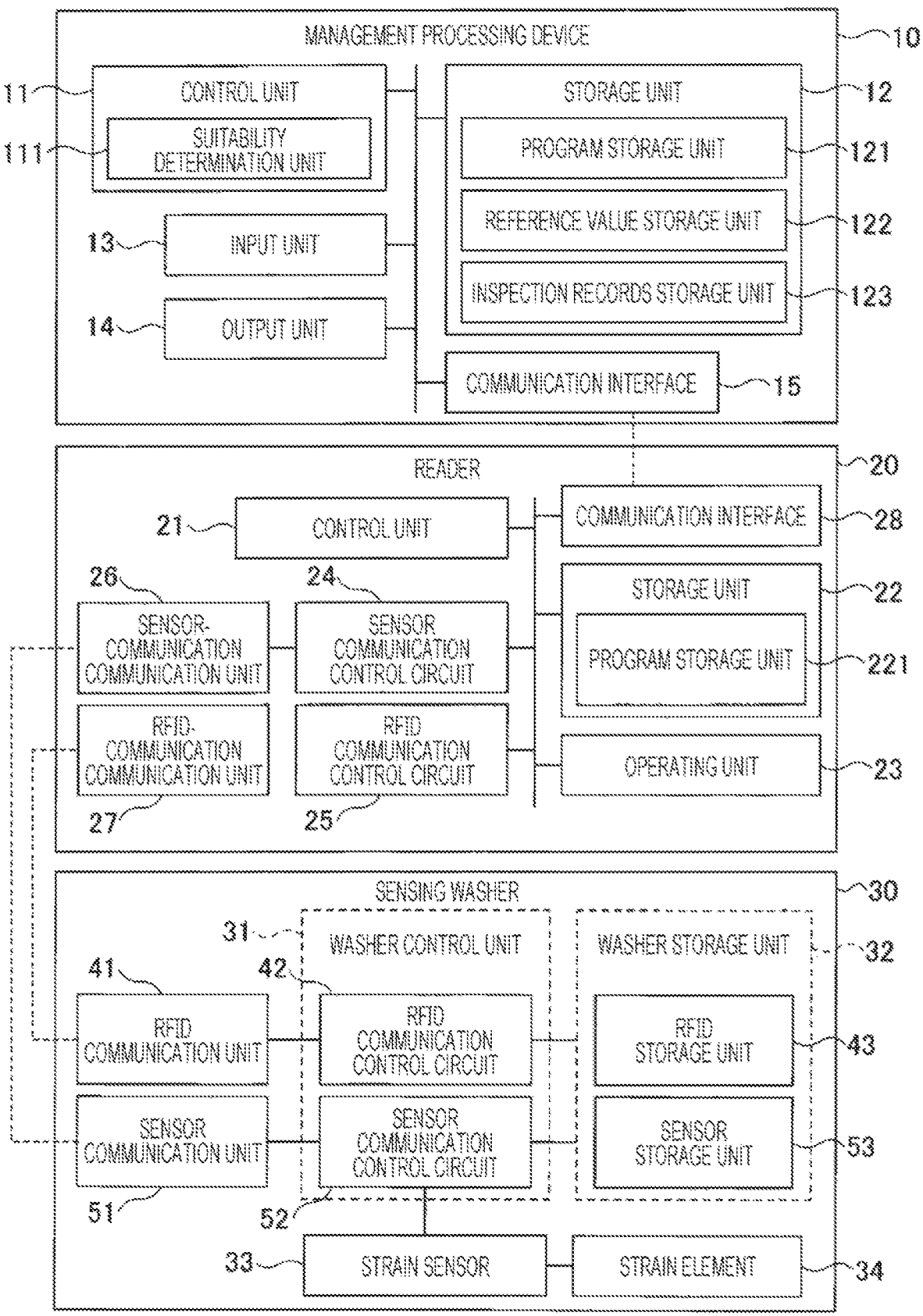
FIG. 1 is a block diagram illustrating an overall configuration of a management system for an attachment state of an attachment object in an embodiment according to the present invention.

Management System of Attachment State of Attachment Object According to Embodiment A management system of an attachment state of an attachment object in an embodiment according to the present invention is a system that manages an attachment state of an attachment object 90 such as an ancillary fitting to be attached to a structural object 80 by a bolt 60 and a nut 70, and is made up of a management processing device 10, a reader 20, and a sensing washer 30, as illustrated in FIG. 1.

The management processing device 10 is a device for inspecting and managing the attachment state of the attachment object 90 on the basis of information read in from the sensing washer 30, and is made up of, for example, a dedicated server, a personal computer, or the like. The management processing device 10 includes a control unit 11 such as a microprocessor unit (MPU), a central processing unit (CPU), or the like, a storage unit 12 made up of a hard disk drive (HDD), a solid state drive (SSD), flash memory, electrically erasable programmable read-only memory (EEPROM), read-only memory (ROM), random-access memory (RAM), or the like, an input unit 13 such as a mouse, a keyboard, a touch panel, or the like, an output unit 14 such as a display, a printer, or the like, and a communication interface 15 that connects the management processing device 10 to a wireless or a wired communication line. The management processing device 10 is communication-connected to the reader 20 via the communication line by the communication interface 15.

The storage unit 12 has a program storage unit 121 that stores predetermined control programs including a suitability determination program for determining suitability of the attachment state of the attachment object 90. The control unit 11 executes predetermined processing following the predetermined control programs, and executes predetermined processing as a suitability determination unit 111 that determines the suitability of the attachment state of the attachment object 90 in collaboration with the suitability determination program.

The storage unit 12 stores a reference value of a stress value generated under a load by which the sensing washer 30 is loaded in nut fastening, as references for determining whether the attachment state of the attachment object 90 is suitable or unsuitable, in a reference value storage unit 122. Set in the reference value is a threshold value serving as a boundary of stress values generated by suitable nut fastening and stress values generated by unsuitable nut fastening. The suitability determination unit 111 uses the set reference value to compare a stress value read in from a certain sensing washer 30 with the reference value, and executes processing of determining whether the nut fastening in which the certain sensing washer 30 is interposed is suitable or unsuitable.

Also, an inspection records storage unit 123 is provided in the storage unit 12, and the inspection records storage unit 123 stores stress values generated in each sensing washer 30 of respective identification information when performing periodic inspection, correlated with the identification information of the sensing washers 30. The inspection records storage unit 123 stores, in a correlated manner, for example, identification information of a certain sensing washer 30, date of performing inspection of the sensing washer 30 of the certain identification information, the stress value generated at the time of inspection of the sensing washer 30 of the certain identification information, identification information of an attachment object 90 that is attached by the sensing washer 30 of the certain identification information, and so forth, in accordance with processing by the suitability determination unit 111 and input of required information. This information is stored for each sensing washer 30 of respective identification information, and also this information is stored at each time each inspection is performed, and accumulated over time.

The reader 20 is equipment that executes wireless communication with the sensing washer 30 and supplies electric power necessary for operations to the sensing washer 30 by wireless power transfer, and also acquires identification information of the sensing washer 30 from the sensing washer 30 by wireless communication and a value equivalent to stress generated at the sensing washer 30 at the time of this wireless communication.

The reader 20 includes a control unit 21 such as a CPU or the like, a storage unit 22 made up of ROM, RAM, flash memory, or the like, an operating unit 23 made up of operating keys, an operation panel, or the like, and a communication interface 28 that connects the reader 20 to a wireless or a wired communication line. A predetermined control program for causing the control unit 21 to execute predetermined processing is stored in a program storage unit 221 of the storage unit 22.

Figure 3A:
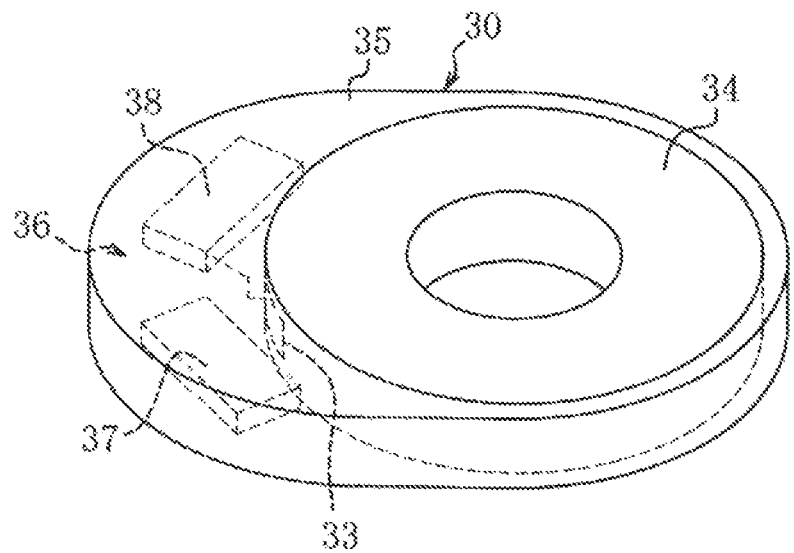
FIG. 3A is a perspective view illustrating an example of the sensing washer that is used in the management system for an attachment state of an attachment object according to the embodiment.
Figure 3B:
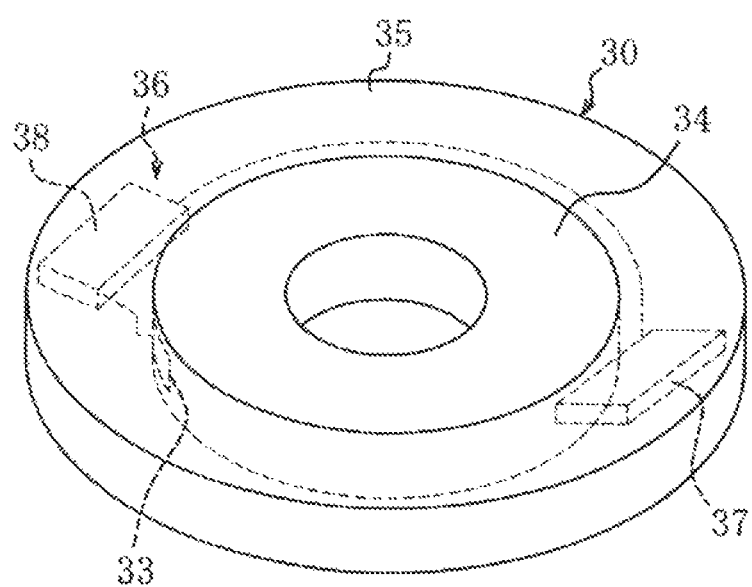
FIG. 3B is a perspective view illustrating an example of the sensing washer that is used in the management system for an attachment state of an attachment object according to the embodiment.

Further, the reader 20 includes a sensor communication control circuit 24 that handles communication with a sensing unit 38 that makes up a sensor module 36 of the sensing washer 30 and wireless power transfer to the sensing unit 38, and a sensor-communication communication unit 26 such as a coil antenna or the like that performs transmission and reception (see FIGS. 1, 3A, and 3B). The sensor communication control circuit 24 performs processing of acquiring the value equivalent to stress from the sensing washer 30 within a range of radio waves arriving from the sensor-communication communication unit 26.

Further, the reader 20 has a radio-frequency identification (RFID) communication control circuit 25 that handles communication with a radio frequency (RF) tag 37 that makes up sensor module 36 of the sensing washer 30 and wireless power transfer to the RF tag 37, and an RFID-communication communication unit 27 such as a coil antenna or the like that performs transmission and reception (see FIGS. 1, 3A, and 3B). The RFID communication control circuit 25 performs processing of acquiring identification information of sensing washers 30, from the sensing washers 30 within a range of radio waves arriving from the RFID-communication communication unit 27.

The RFID communication control circuit 25 and the sensor communication control circuit 24 execute predetermined operations under control of the control unit 21 collaborating with predetermined control programs. Thus, the reader 20 acquires by wireless communication, from a sensing washer 30 within intercommunication range, identification information of this sensing washer 30 and the value equivalent to stress thereof at the time of communication, and transmits the identification information of the sensing washer 30 and the value equivalent to stress thereof that are acquired to the management processing device 10 via the communication interface 28, in a compatible format. Note that the formats of wireless power transfer to the sensing unit 38 and wireless power transfer to the RF tag 37 may be based on either radio waves or electromagnetic induction, and the formats for wireless power transfer and communication of the sensing unit 38 and the RF tag 37 are preferably the same.

The sensing washer 30 is provided with the RF tag 37 and the sensing unit 38 making up the sensor module 36 which are accommodated in a casing 35 that is insulating, such as a casing 35 that is non-metallic such as synthetic resin or the like, for example, as illustrated in FIGS. 3A and 3B. The RF tag 37 of the sensing washer 30 is made up of an RFID communication unit 41 such as a coil antenna or the like that performs transmission and reception, an RFID communication control circuit 42, flash memory, and an RFID storage unit 43 such as EEPROM or the like. Electric power necessary for operations of the RFID communication control circuit 42 is supplied from the reader 20 by wireless power transfer (see FIGS. 1, 3A, and 3B). The RFID storage unit 43 stores the identification information of the sensing washer 30 that accommodates the RF tag 37. The RFID communication control circuit 42 reads out the identification information of the sensing washer 30 from the RFID storage unit 43 at the time of receiving wireless power transfer in communication with the reader 20, and transmits the identification information of the sensing washer 30 to the reader 20 via the RFID communication unit 41.

The sensing unit 38 of the sensing washer 30 is made up of a sensor communication unit 51 such as a coil antenna or the like that performs transmission and reception, a sensor communication control circuit 52, flash memory, and a sensor storage unit 53 such as EEPROM or the like. Electric power necessary for operations of the sensor communication control circuit 52 is supplied from the reader 20 by wireless power transfer (see FIGS. 1, 3A, and 3B). A predetermined control program for controlling the sensor communication control circuit 52 is stored in the sensor storage unit 53. At the time of receiving wireless power transfer in communication with the reader 20, the sensor communication control circuit 52 that collaborates with a predetermined control program acquires, from a strain sensor 33 that is equivalent to a sensor capable of detecting the value equivalent to stress of the stress the sensing washer 30 is loaded with, a resistance value sensed by the strain sensor 33 in accordance with deformation of a strain element 34 as the value equivalent to stress, and transmits the resistance value equivalent to the value equivalent to stress to the reader 20 via the sensor communication unit 51.

The RFID storage unit 43 of the RF tag 37 and the sensor storage unit 53 of the sensing unit 38 in the present embodiment make up a washer storage unit 32 that stores identification information of the sensing washer 30, the RFID communication control circuit 42 of the RF tag 37 and the sensor communication control circuit 52 of the sensing unit 38 make up a washer control unit 31 that transmits the value equivalent to stress and identification information of the sensing washer 30 via a communication unit made up of the RFID communication unit 41 and the sensor communication unit 51, each of these being accommodated in the casing 35 (see FIGS. 1 to 3B). Also, the washer control unit 31, the communication unit, and the washer storage unit 32, in other words the RF tag 37 and the sensing unit 38, in the sensing washer 30, are placed distanced from the strain element 34, which will be described later.

Figure 2:
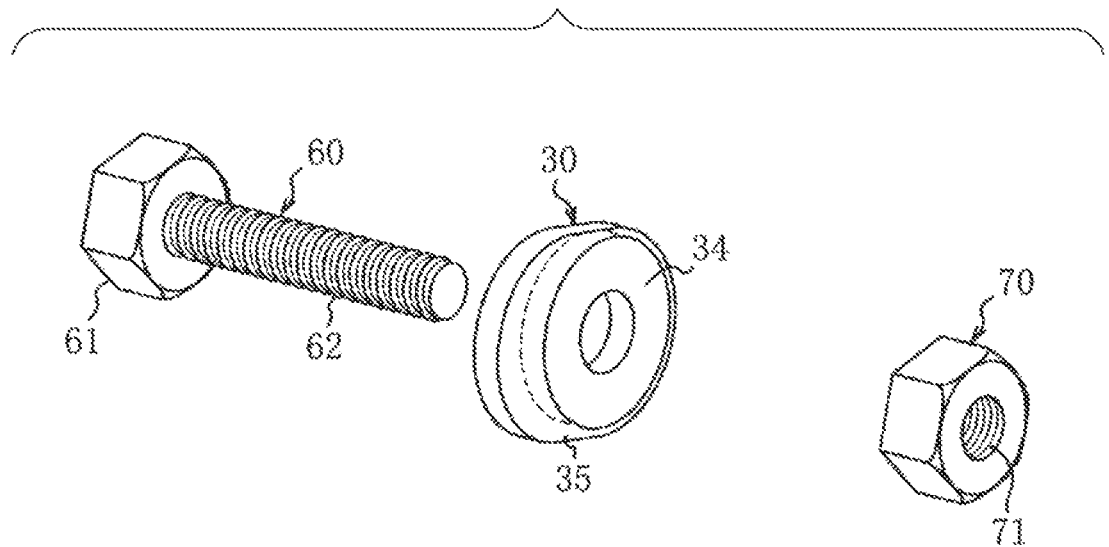
FIG. 2 is a perspective view illustrating a sensing washer, a bolt, and a nut that are used in the management system for an attachment state of an attachment object according to the embodiment.

The sensor communication control circuit 52 of the sensing unit 38 in the sensing washer 30 is connected to the strain sensor 33 that is fixed by adhesive agent or the like to the strain element 34 that is ring-like in form and that is loaded with stress, as illustrated in FIGS. 1, 3A, and 3B. The sensing washer 30 is used in combination with a bolt 60 such as a hexagonal bolt made up of a head portion 61 and a male thread portion 62 formed on a shaft portion, and a nut 70 such as a hexagonal nut having a female thread portion 71, as illustrated in FIG. 2, for example. The male thread portion 62 of the bolt 60 is passed through a center hole of the strain element 34, the sensing washer 30 is disposed so as to be interposed between the bolt 60 and the nut 70 that are attaching the attachment object 90 to the structural object 80, and the strain element 34 that is made of metal or the like is loaded with stress.

Also, the casing 35 of the sensing washer 30 in the present embodiment is not concentric with the strain element 34 that is ring-like in form in the arrangement illustrated in FIG. 3A, but rather has a racetrack-like form with the strain element 34 placed at a position laterally deviated as to a fastening direction, to one arc-like portion side of the casing 35. Accordingly, in a state in which the sensing washer 30 is interposed between the bolt 60 and the nut 70, the casing 35 is provided at a position that is laterally deviated and flaring from the nut 70. The RF tag 37 and the sensing unit 38, or the washer storage unit 32 and the washer control unit 31, are accommodated in this flared portion. Alternatively, an arrangement in which the casing 35 is formed concentrically with the strain element 34 such as illustrated in FIG. 3B may be used.

Figure 4:
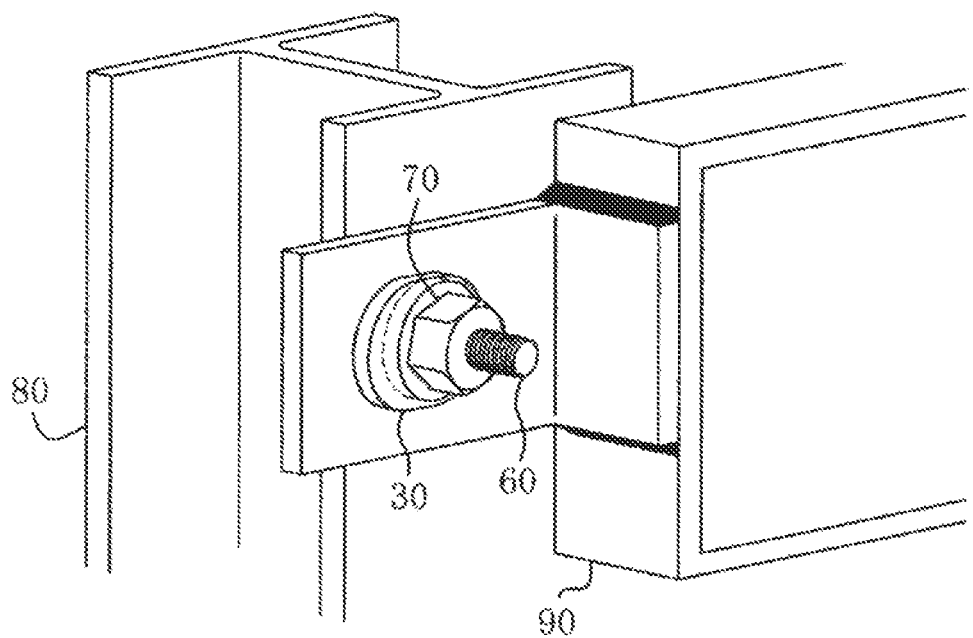
FIG. 4 is a partial perspective view illustrating a state in which an attachment object is attached to a structural object by the sensing washer, the bolt, and the nut that are used in the embodiment.
Figure 6:
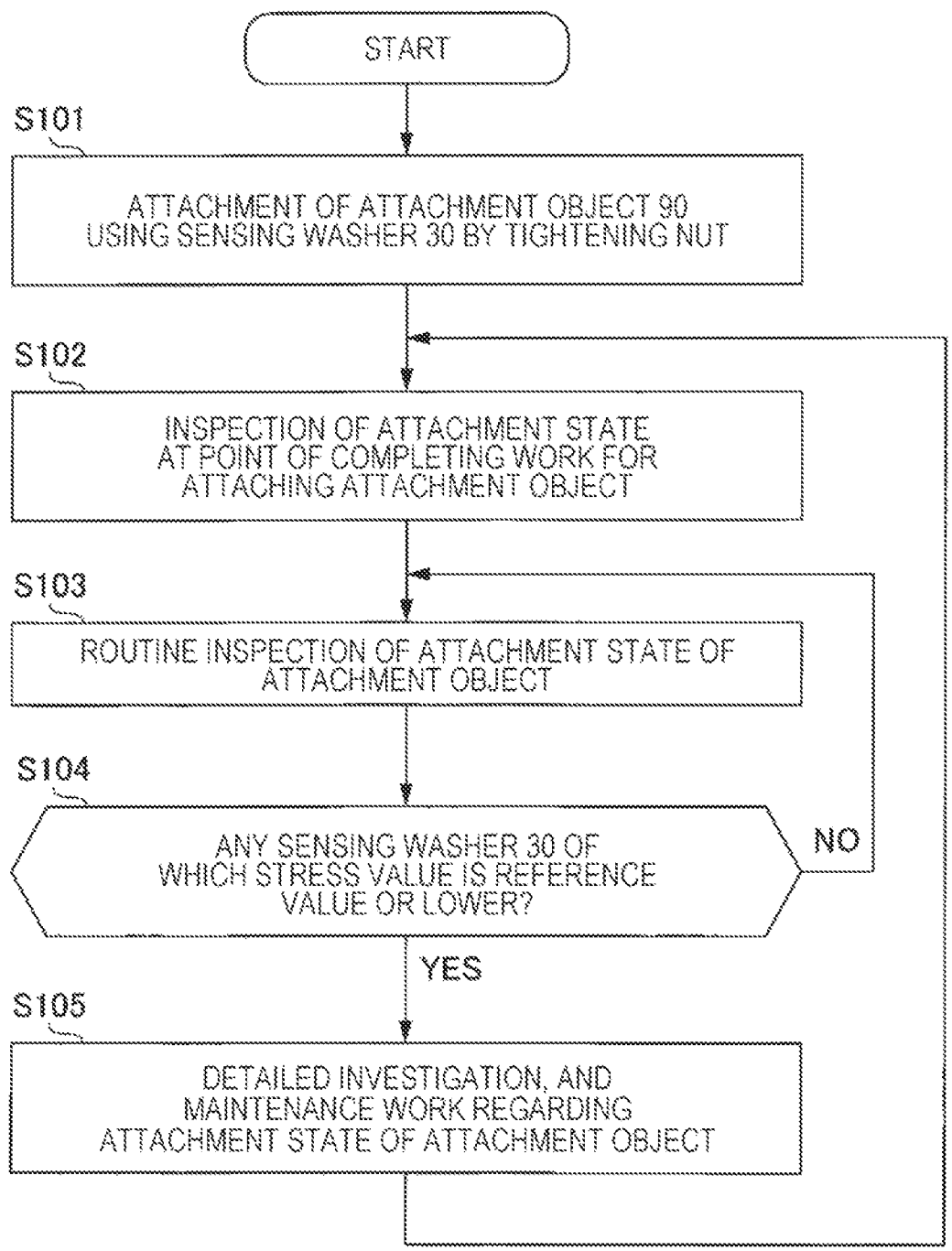
FIG. 6 is a flowchart showing a flow of attachment, periodic inspection, and maintenance work, of the attachment object, performed using the management system for an attachment state of an attachment object according to the embodiment.

When using the management system for an attachment state of an attachment object according to the present embodiment, nut tightening is performed in a state in the sensing washer 30 is interposed between the bolt 60 and the nut 70, thereby attaching the attachment object 90 such as an ancillary fitting or the like is attached to the structural object 80, as illustrated in FIG. 4, for example (see S101 in FIG. 6). Thereafter, inspection and installation confirmation of the attachment state at the point in time of completing installation of attaching the attachment object are performed (S102). Note that the inspection and the installation confirmation of the attachment state at the point in time of completing installation of attaching the attachment object can be suitably performed by the same method as with periodic inspection in which the value equivalent to stress and the stress value of the sensing washer 30 are acquired, which will be described later.

Figure 5:
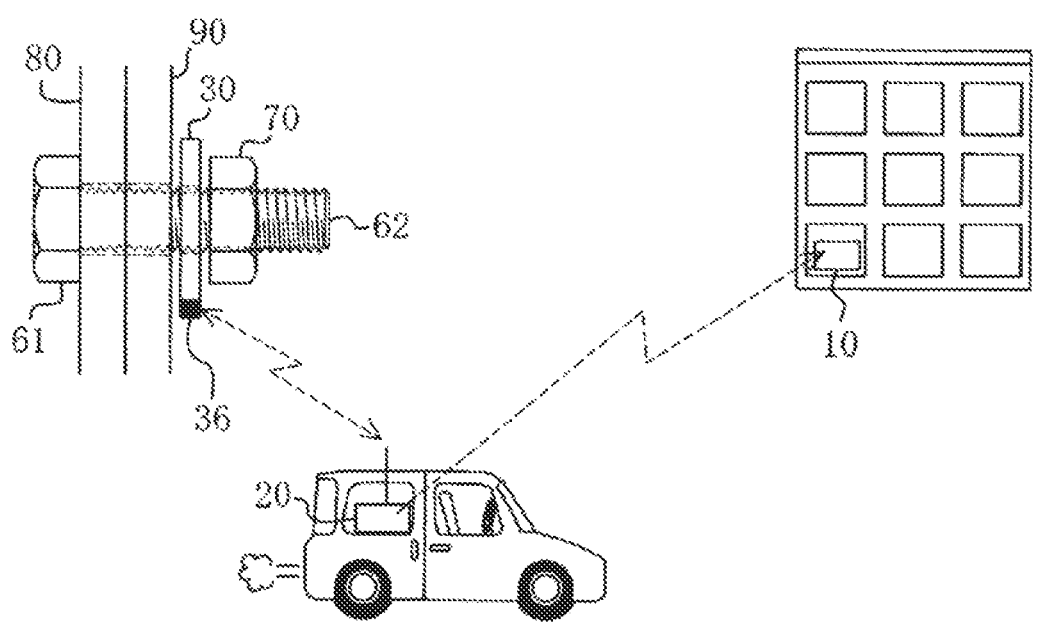
FIG. 5 is an explanatory diagram for describing communication performed during inspection in the management system for an attachment state of an attachment object according to the embodiment.

Thereafter, periodic inspection of the attachment state of the attachment object 90 is performed after a certain period elapses following attaching the attachment object 90 (S103). In the periodic inspection, as illustrated in FIG. 5, communication is performed between the reader 20 and the sensing washer 30 interposed between the bolt 60 and the nut 70 attaching the attachment object 90 to the structural object 80 by nut tightening, in which wireless power transfer is performed to the sensing washer 30 by the reader 20, and also the reader 20 acquires identification information of the sensing washer 30, and the resistance value (value equivalent to stress) of the strain sensor 33 corresponding to the amount of deformation of the strain element 34 of that sensing washer 30 under tightening force of the nut tightening, from the sensing washer 30 by wireless communication. Acquisition of the identification information of the sensing washer 30 and the resistance value corresponding to the value equivalent to stress, from the sensing washer 30, may be performed by the reader 20 in a stationary state, or may be performed by the reader 20 traveling by foot, vehicle, or the like.

The identification information of the sensing washer 30 and the resistance value corresponding to the value equivalent to stress of the sensing washer 30, acquired by the reader 20, are transmitted from the reader 20 to the management processing device 10 via a communication line, and received and acquired by the management processing device 10 (see FIGS. 1 and 5). In other words, the management processing device 10 acquires the resistance value corresponding to the value equivalent to stress and the identification information of the sensing washer 30, transmitted from the sensing washer 30, via the reader 20.

The suitability determination unit 111 of the management processing device 10 acquires the stress value of the sensing washer 30 having the acquired identification information, by multiplying the acquired resistance value by a set multiplier that is changeably set in the suitability determination program. The suitability determination unit 111 may compare the acquired stress value with the reference value read out from the reference value storage unit 122. In a case in which the acquired stress value exceeds the reference value, the suitability determination unit 111 may present suitability information, regarding the nut fastening corresponding to the sensing washer 30 of the acquired identification information as relational information with respect to the reference value, at the output unit 14, and in a case in which the acquired stress value is no greater than the reference value, may present unsuitability information regarding the nut fastening corresponding to the sensing washer 30 of the acquired identification information as relational information with respect to the reference value (see S104 in FIG. 6, and FIG. 1).

Figure 7:
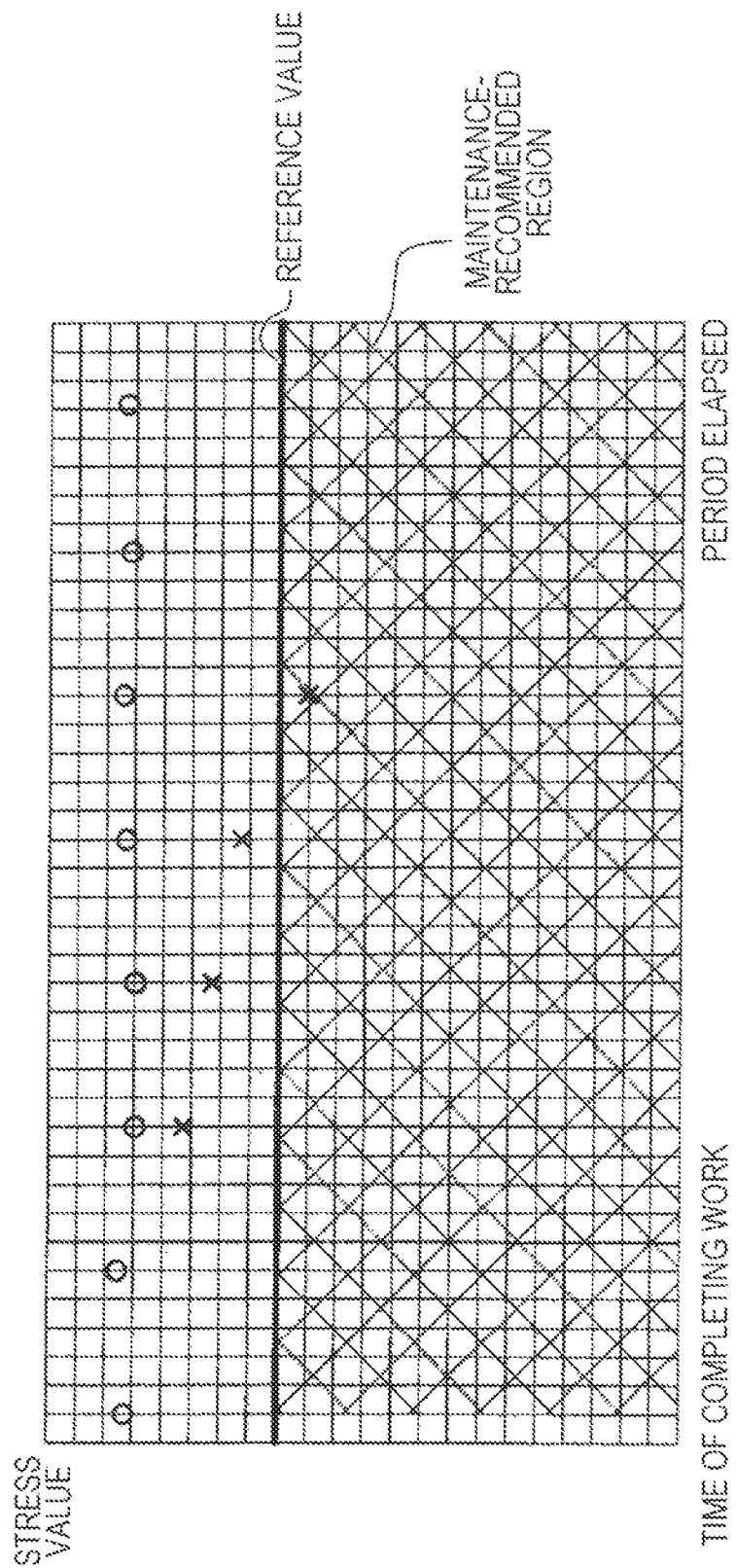
FIG. 7 is a conceptual explanatory diagram of inspection record data accumulated using the management system for an attachment state of an attachment object according to the embodiment.

Note that in a case of presenting the stress value of the sensing washer 30 as relational information with respect to the reference value, an arrangement may be made in which a stress value of a sensing washer 30 of particular identification information and the reference value are output to a display or the like of the output unit 14 at the same time, thereby presenting the stress value as relational information with respect to the reference value, and further, an arrangement may be made in which a stress value of a sensing washer 30 of particular identification information and the reference value are presented at the same time, and also change of stress values of the sensing washer 30 of the particular identification information over time in each inspection may be shown, as in FIG. 7.

In the example in FIG. 7, the vertical axis represents stress values of sensing washers 30 and the horizontal axis represents the time elapsed after completion of installation, indicating change over time of stress values of a sensing washer 30 of which the identification information is indicated by a circle, in each periodic inspection, and change over time of stress values of a sensing washer 30 of which the identification information is indicated by a cross, in each periodic inspection. The stress values of the sensing washer 30 of which the identification information is indicated by a circle show results corresponding to suitable tightening force, exceeding the reference value in all periodic inspections performed over time, while the stress values of the sensing washer 30 of which the identification information is indicated by a cross fell below the reference value in a periodic inspection at a certain point in time, and are in a maintenance-recommended region no greater than the reference value. The slight rising and falling change in the stress value of the sensing washer 30 of which the identification information is indicated by a circle in FIG. 7 is due to the bolt 60 expanding and shrinking under seasonal and sunlight conditions, and the stress value of the sensing washer 30 rising and falling accordingly. This rising and falling change may be corrected by the suitability determination program of the management processing device 10, in accordance with conditions of temperature and so forth acquired separately at the time of inspection.

Also, while the resistance value acquired by the sensing washer 30 from the strain sensor 33 is transmitted from the sensing washer 30 to the reader 20 as the value equivalent to stress in the above example, an appropriate value that is equivalent to stress of the sensing washer 30 can be used for the value equivalent to stress, and a sensor corresponding to the type of value equivalent to stress being used, can be employed. Further, the stress value itself can be taken as the value equivalent to stress. In a case of taking the stress value itself as the value equivalent to stress, for example, a configuration is made in which the sensor communication control circuit 52 acquires the resistance value from the strain sensor 33 as a predetermined value from which the value equivalent to stress that is the stress value can be calculated, the sensor communication control circuit 52 acquires the stress value of the value equivalent to stress from the resistance value following a predetermined control program in the sensor storage unit 53, and transmits the acquired stress value to the reader 20, or the like.

By the management processing device 10 presenting the relational information, it can be comprehended that there is a fastening site of the bolt 60 and the nut 70 that correspond to the sensing washer 30, at which the nut fastening is unsuitable, and the location thereof is comprehended, following which a detailed investigation is performed regarding the attachment object 90 and the nut fastening thereof at the location where the nut fastening is unsuitable, and maintenance work is performed for the attachment state of the attachment object 90 (see S105 in FIG. 6).

According to the management system for an attachment state of an attachment object of the present embodiment, presenting relational information of the value equivalent to stress of the stress by which the sensing washer 30 used for attaching the attachment object 90 is loaded, and the reference value for the stress value, enables suitable states and unsuitable states of nut fastening to be accurately comprehended in accordance with the sensing washer 30. Accordingly, suitable states and unsuitable states of attachment of the attachment object 90 such as an ancillary fitting or the like, attached by the bolt 60 and the nut 70, can be accurately comprehended. Also, the management processing device 10 acquiring the value equivalent to stress and the identification information of the sensing washer 30 that are transmitted from the sensing washer 30, and presenting relational information, enables the value equivalent to stress and the identification information of the sensing washer 30 that are transmitted from the sensing washer 30 to be received while traveling in an automobile in which the reader 20 is loaded for example, and so forth, and inspection work can be performed in a short time at low costs.

Also, transmitting the value equivalent to stress and the identification information of the sensing washer 30 from the sensing washer 30 via the communication unit enables application to high places and places in service for traffic, and accordingly the safety of inspection work of the attachment state of attachment objects can be improved. Also, the present management system can be used not only at the time of inspection work for the attachment state of attachment objects, but for installation completion testing immediately following attachment of the attachment object. Also, the work of applying conventional match marks can be done away with, and the amount of labor in the installation work to perform attachment of the attachment object 90 suitably can be reduced. Also, the present management system can be applied to attachment objects 90 already attached to structural objects 80 by bolts 60 and nuts 70 via ordinary washers, by replacing the ordinary washers with the sensing washer 30.

In a case of the management processing device 10 performing processing of acquiring the value equivalent to stress and the identification information of the sensing washer 30 transmitted from the sensing washer 30, and storing the value equivalent to stress or a stress value corresponding thereto of the sensing washer 30 having the identification information in the inspection records storage unit 123 of the storage unit 12 periodically with predetermined intervals therebetween, quantitative values equivalent to stress or stress values corresponding to the sensing washer 30 of this identification information can be automatically accumulated as a periodic inspection record, for example.

Accordingly, by presenting suitability information and unsuitability information of nut fastening regarding a sensing washer of this identification information, suitability and unsuitability of the attachment state of the attachment object can be accurately and reliably comprehended, regardless of the level of skill of the manager. Also, in a case in which the value equivalent to stress corresponding to a sensing washer 30 of particular identification information or a stress value corresponding thereto, and the reference value, are presented at the same time, as relational information, the manager can speedily and accurately recognize information relating to the attachment state of the attachment object 90, such as for example, the state of the nut fastening, whether maintenance of the attachment state of the attachment object 90 is necessary or unnecessary at the current point in time, when the time at which maintenance of the attachment state of the attachment object 90 is predicted to be necessary, and so forth.

Also, in a case in which the washer control unit 31 of the sensing washer 30 transmits the resistance value that the strain sensor 33 senses in accordance with deformation of the strain element 34 as the value equivalent to stress, the resistance value can be easily acquired as the value equivalent to stress of the sensing washer 30 interposed between the bolt 60 and the nut 70, and transmitted from the sensing washer 30.

Also, accommodating the washer control unit 31 of the sensing washer 30, and the communication unit made up of the RFID communication unit 41 of the RF tag 37 and the sensor communication unit 51 of the sensing unit 38, in the casing 35 that is insulating, can do away with attenuation of communication signals occurring in a case in which the casing is electroconductive, such as being made of metal or the like, and good communication performance can be secured. Also, in a case in which the strain element 34 is made of metal, placing the washer control unit 31 of the sensing washer 30, and the communication unit made up of the RFID communication unit 41 of the RF tag 37 and the sensor communication unit 51 of the sensing unit 38, so as to be distanced from the strain element 34 that is made of metal, can do away with attenuation of communication signals occurring in a case in which the strain element that is electroconductive, and the washer control unit 31 and communication unit are in close proximity, and good communication performance can be secured. Note that in a case in which the communication unit made up of the RFID communication unit 41 and the sensor communication unit 51 can be placed separately from the other portions of the RF tag 37 and the sensing unit 38, just the communication unit of the sensing washer 30 may be accommodated in the casing 35 that is insulating, and placed so as to be distanced from the strain element 34 that is made of metal. By at least accommodating the communication unit in the casing 35 that is insulating and placing so as to be distanced from the strain element 34 that is metal, attenuation of communication signals can be done away with, and effects of securing good communication performance can be obtained, in the same way as in the above.

Also, providing the casing 35 of the sensing washer 30 so as to be laterally deviated and flaring from the nut 70, interference between the sensing washer 30 and a nut 70 screwed to an adjacent bolt 60 attaching the attachment object 90, for example, can be prevented while securing accommodation space for the washer storage unit 32 and the washer control unit 31 in the sensing washer 30. Also, by forming the casing 35 of the sensing washer 30 so as to be laterally deviated and flaring from the strain element 34, rather than reducing the size, enables the sensing washer 30 to be manufactured at lower costs, and also facilitates visual comprehension that a sensor, such as the sensing washer 30, the strain sensor 33, or the like, is disposed at the nut fastening site.

Also, electric power necessary for operations of the washer control unit 31 of the sensing washer 30 may be supplied from the reader 20 by wireless power transfer, whereby disposing a battery at the sensing washer 30 side becomes unnecessary, and reduced size of the form of the sensing washer 30, reduced costs, and long life, can be realized.

Inclusive Range of Invention Disclosed in Present Specification

The invention disclosed in the present specification includes, besides each invention and embodiment listed as the invention, arrangements in which partial contents thereof are changed to other contents disclosed in the present specification and specified, or arrangements in which other contents disclosed in the present specification are added to these contents and specified, or arrangements in which such partial contents are deleted to a limit of obtaining partial advantageous effects, and specified as a higher concept, within an applicable range. The invention disclosed in the present specification also includes the following contents and modifications.

Figure 8:
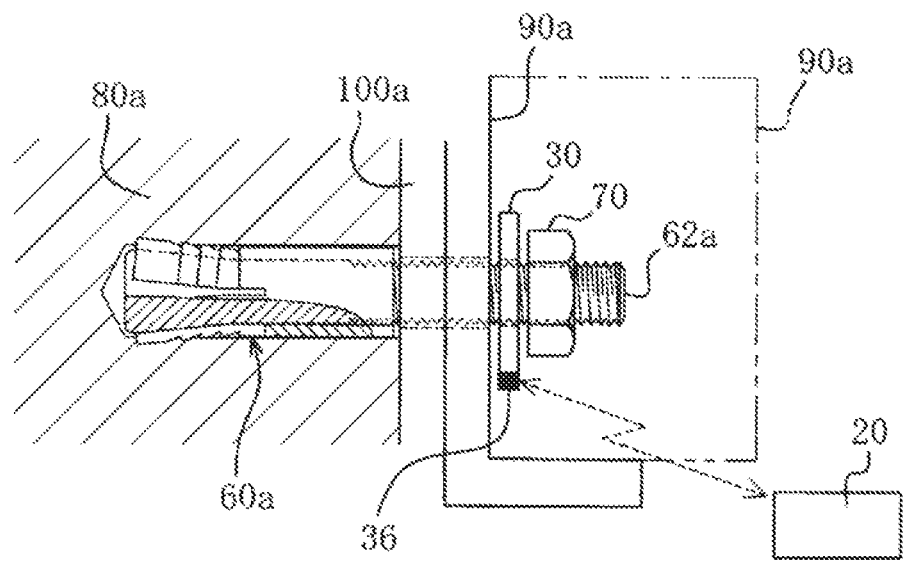
FIG. 8 is an explanatory diagram of an example of applying the management system for an attachment state of an attachment object according to the embodiment to an anchor bolt.
Figure 9A:
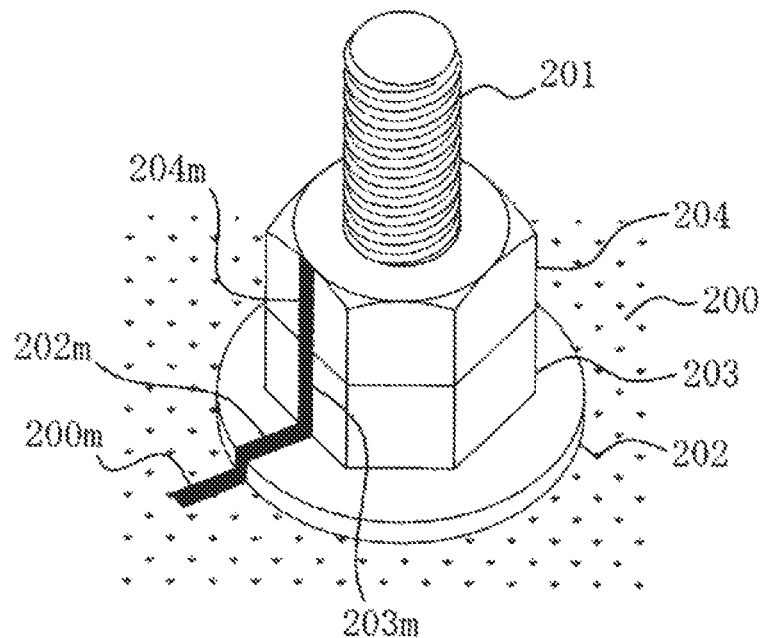
FIG. 9A is a diagram illustrating a case of a suitable state in which there is no looseness in a nut fastening in inspection using conventional match marks.
Figure 9B:
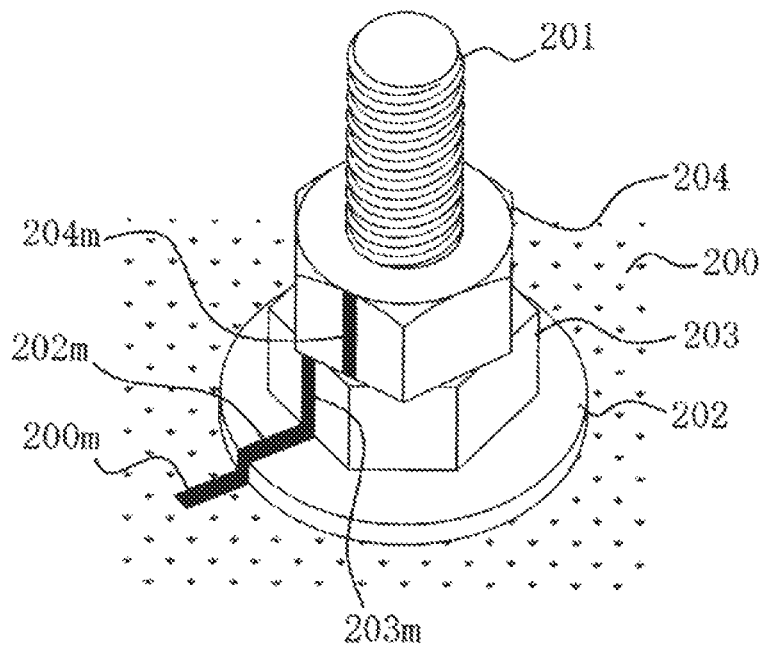
FIG. 9B is a diagram illustrating a case of an unsuitable state in which there is looseness in a nut fastening in inspection using the conventional match marks.

The bolt and the nut of the nut fastening between which the sensing washer 30 is interposed, to which the management system for an attachment state of an attachment object according to the present invention is applied, can be employed as appropriate, and are not limited to the bolt 60 and the nut 70 of the above embodiment. For example, the sensing washer 30 can be suitably interposed at a nut fastening site according to a combination of an anchor bolt 60a illustrated in FIG. 8 and the nut 70 that is screwed to a male thread portion 62a of the anchor bolt 60a. In the example in FIG. 8, the anchor bolt 60a is placed in a structural object 80a, an attachment plate 100a and an attachment object 90a such as an ancillary fitting or the like are fit over the male thread portion 62a of the anchor bolt 60a protruding from the structural object 80a, the sensing washer 30 is placed on the outer side thereof, and the nut 70 is screwed onto the male thread portion 62a from the further outer side thereof, and is fastened. In this example as well, the identification information of the sensing washer 30 and the value equivalent to stress are transmitted from the sensing washer 30 to the reader 20, and further, this information is transmitted from the reader 20 to the management processing device 10, in the same way as the embodiment above.

Also, although the reader 20 and the management processing device 10 are separate entities in the above embodiment, a configuration may be made in which a management processing device such as dedicated electronic equipment having the structure and functions of the reader 20 is used, and the value equivalent to stress and the identification information of the sensing washer 30 that are transmitted from the sensing washer 30 are directly received and acquired by this management processing device. In this case, electric power necessary for operations of the washer control unit 31 of the sensing washer 30 may be supplied by wireless power transfer by the management processing device having the structure and functions of the reader 20, thereby performing communication with the sensing washer 30.

Also, although the sensor module 36 is made up of the RF tag 37 and the sensing unit 38 in the above embodiment, a configuration made be made in which the RFID communication control circuit 42 of the RF tag 37 is connected to the strain sensor 33, the RFID communication control circuit 42 that follows a predetermined control program acquires the identification information of the sensing washer 30 and a resistance value corresponding to the value equivalent to stress of the strain sensor 33 at the time of communication and wireless power transfer with the reader 20, and transmits the identification information of the sensing washer 30 and the resistance value corresponding to the value equivalent to stress that are acquired to the reader 20 via the RFID communication unit 41, in other words, a configuration in which the sensor module 36 is made up of the RF tag 37 alone.

Also, the form in which the casing 35 is provided at a position that is laterally deviated and flaring from the nut 70 is not limited to the racetrack-like form laterally deviated as to the fastening direction in the above example, and may be formed as appropriate. For example, a form in which the casing 35 has a fan-like form, and an arc side of the fan form is laterally deviated and flares to the outer side is also suitable. Note that the casing according to the present invention is not limited to a form provided at a position that is laterally flared, and a casing of a form that is annularly formed concentrically on an outer circumference of the strain element 34, for example, may be used. Also, although a configuration is made in the above example in which the sensing washer 30 is disposed in place of an ordinary washer, both the sensing washer 30 and an ordinary washer may be interposed between the bolt 60 or 60a and the nut 70 or the like.

Also, in the above embodiment, the sensor module 36 is made up of the RF tag 37 and the sensing unit 38 of a passive type with no battery disposed in the sensing washer 30, but a configuration may be made in which an active-type sensor module with a battery in the sensing washer 30 is provided, and the reader or the management processing device according to the present invention receives the identification information of the sensing washer 30 and the value equivalent to stress from the active-type sensor module by wireless communication.

INDUSTRIAL APPLICABILITY

The present invention can be used when inspecting the attachment state of attachment objects attached by bolts and nuts to structural objects, for example.

What is claimed is:
1. A management system for an attachment state of an attachment object, the management system comprising:
   a sensing washer that is interposed between a bolt and a nut that attach the attachment object to a structural object, the sensing washer including:
      a strain element that is ring-shaped, the bolt being configured to pass through a hole of the strain element, the nut being configured to directly contact the strain element;
      a strain sensor fixed to the strain element, the strain sensor being configured to detect one of a stress value equivalent to stress being loaded to the strain element and a predetermined value from which the stress value equivalent to the stress is calculated, the predetermined value relating to the stress, the stress corresponding to a resistance value sensed by the strain sensor in accordance with deformation of the strain element;
      a washer storage unit configured to store identification information of the sensing washer;
      a washer control unit configured to transmit the identification information and one of the stress value and the predetermined value via a communication unit; and
      a casing accommodating the strain element, the strain sensor, the washer storage unit, and the washer control unit, the casing being provided at a position that is laterally deviated and flaring from the nut; and
   a management processing device configured to:
      acquire the identification information and one of the stress value and the predetermined value from the sensing washer;
      present relational information representing a relationship between a reference value stored in a device storage unit and one of the stress value and the predetermined value;
      compare the reference value with one of the stress value and the predetermined value;
      present suitability information of a nut fastening corresponding to the sensing washer having the identification information as the relational information when one of the stress value and the predetermined value is more than the reference value; and
      present unsuitability information of the nut fastening corresponding to the sensing washer having the identification information as the relational information when one of the stress value and the predetermined value is equal to or less than the reference value, wherein
   the washer storage unit and the washer control unit are placed in a region other than a region that is tightened by the nut.
2. The management system for an attachment state of an attachment object according to claim 1, wherein the management processing device is further configured to present, as the relational information, the reference value and one of the stress value and the predetermined value at the same time.

3. The management system for an attachment state of an attachment object according to claim 1, wherein
the communication unit is accommodated in the casing that is insulating,
the strain element is made of metal, and
the communication unit is placed distanced from the strain element.

4. The management system for an attachment state of an attachment object according to claim 1, wherein electric power necessary for operations of the washer control unit of the sensing washer is supplied by wireless power transfer from:
a reader that transmits one of the stress value and the predetermined value and the identification information of the sensing washer that are transmitted from the sensing washer to the management processing device; or
the management processing device.

* * * * *